United States Patent
Wei (10) Patent No.: US 11,392,505 B2
(45) Date of Patent: Jul. 19, 2022

(54) REBUILDING LOGICAL-TO-PHYSICAL ADDRESS MAPPING WITH LIMITED MEMORY

(71) Applicant: Micron Technology, Inc., Boise, ID (US)

(72) Inventor: Meng Wei, Shanghai (CN)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 16/938,454

(22) Filed: Jul. 24, 2020

(65) Prior Publication Data

US 2022/0012182 A1 Jan. 13, 2022

(30) Foreign Application Priority Data

Jul. 10, 2020 (WO) ................ PCT/CN2020/101394

(51) Int. Cl.
*G06F 12/1009* (2016.01)

(52) U.S. Cl.
CPC .. *G06F 12/1009* (2013.01); *G06F 2212/1044* (2013.01); *G06F 2212/657* (2013.01)

(58) Field of Classification Search
CPC ................ G06F 3/061; G06F 12/0246; G06F 2212/7201; G06F 2212/7203; G11C 2207/2245
See application file for complete search history.

(56) References Cited

U.S. PATENT DOCUMENTS

| 2014/0325117 | A1* | 10/2014 | Canepa ............... G06F 12/0246 711/103 |
|---|---|---|---|
| 2017/0270040 | A1 | 9/2017 | Kim et al. |
| 2017/0322888 | A1 | 11/2017 | Booth et al. |
| 2018/0052768 | A1 | 2/2018 | Bae et al. |
| 2020/0192814 | A1 | 6/2020 | Hanna et al. |

OTHER PUBLICATIONS

International Search Report and Written Opinion, PCT App. No. PCT/CN2020/101394, dated Apr. 22, 2021, 10 pages.

* cited by examiner

*Primary Examiner* — Gary W. Cygiel
(74) *Attorney, Agent, or Firm* — Nicholson De Vos Webster & Elliott LLP

(57) ABSTRACT

Exemplary methods, apparatuses, and systems include reading logical-to-physical (L2P) table entries from non-volatile memory into volatile memory. Upon detection of a trigger to recover L2P data that was unmerged with the L2P table entries, a copy of an L2P journal is read from non-volatile memory. The L2P journal includes the L2P data that was unmerged with the L2P table entries. One or more of the L2P table entries are updated using the L2P data from the L2P journal.

20 Claims, 7 Drawing Sheets

REBUILDING LOGICAL-TO-PHYSICAL ADDRESS MAPPING WITH LIMITED MEMORY

CROSS-REFERENCE TO RELATED APPLICATION

The present application claims the benefit of International Application No. PCT/CN2020/101394 filed on Jul. 10, 2020, which is hereby incorporated by reference.

TECHNICAL FIELD

The present disclosure generally relates to maintaining logical-to-physical address mappings, and more specifically, relates to maintaining and rebuilding logical-to-physical address mappings with limited memory.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to maintaining and rebuilding logical-to-physical (L2P) address mappings in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, a SLC can store one bit of information and has two logic states.

Conventional memory subsystems use address translation data structures (e.g., L2P tables) to map logical addresses provided by a host system to physical addresses within the memory subsystem. The memory subsystem often provides sufficient volatile memory storage to load all L2P address mappings into volatile memory for fast address translation. For example, a memory subsystem with 512 gigabytes of non-volatile storage can have 512 megabytes of volatile storage, which is sufficient to store all L2P address mappings for the 512 gigabytes of non-volatile storage. In the event of an asynchronous power loss (APL) or other event in which updates to the L2P in volatile memory are not copied to the non-volatile memory (lost L2P address mappings), the memory subsystem can reload the last stored copy of L2P address mappings back into volatile memory. The loading process is efficient because it can utilize the memory subsystem array bandwidth to read the L2P address mappings in parallel or an interleaved manner. The memory subsystem can then recover lost L2P address mappings by reading host data entries in the non-volatile memory that were written after the last update to the L2P address mappings in non-volatile memory and by updating L2P address mappings as needed based upon metadata stored along with the host data (e.g., a copy of the virtual address for the data is stored as metadata).

Some memory subsystems, however, have limited amounts of volatile memory storage (e.g., to reduce cost). As a result, such memory subsystems are unable to load all L2P address mappings into volatile memory. For example, a memory subsystem with 512 gigabytes of non-volatile storage but only 1 megabyte of volatile memory storage can only load a small fraction of the L2P address mappings. This memory subsystem loads L2P address mappings as needed, evicting and copying in portions of the L2P address mappings while running. In the event of an asynchronous power loss (APL) or other event in which updates to the L2P in volatile memory are not copied to the non-volatile memory, however, this memory subsystem lacks the efficiency of reading the L2P address mappings in parallel or an interleaved manner. Recovery of lost L2P address mappings results in numerous sequential reads of portions of the L2P address mappings into the limited volatile storage space. This recovery process, especially in an instance of random writes that result in a greater number of L2P address mappings to be loaded for recovery, can delay the memory subsystem's time to ready (TTR) beyond system requirements.

Aspects of the present disclosure address the above and other deficiencies by maintaining and using L2P journals to track L2P table entries evicted from the limited volatile memory. Data for evicted entries are recorded in a L2P journal buffer in volatile memory and, once the buffer is full or otherwise satisfies a threshold, a copy of the L2P journal is written to non-volatile memory. Tracking evicted table entries in this manner is more efficient than updating all impacted L2P entries in non-volatile storage with each eviction. Additionally, the recovery of lost L2P table entries is performed more efficiently using the one or more L2P journal copies written to the non-volatile memory to update the last saved values of the L2P table entries.

Figure 1:
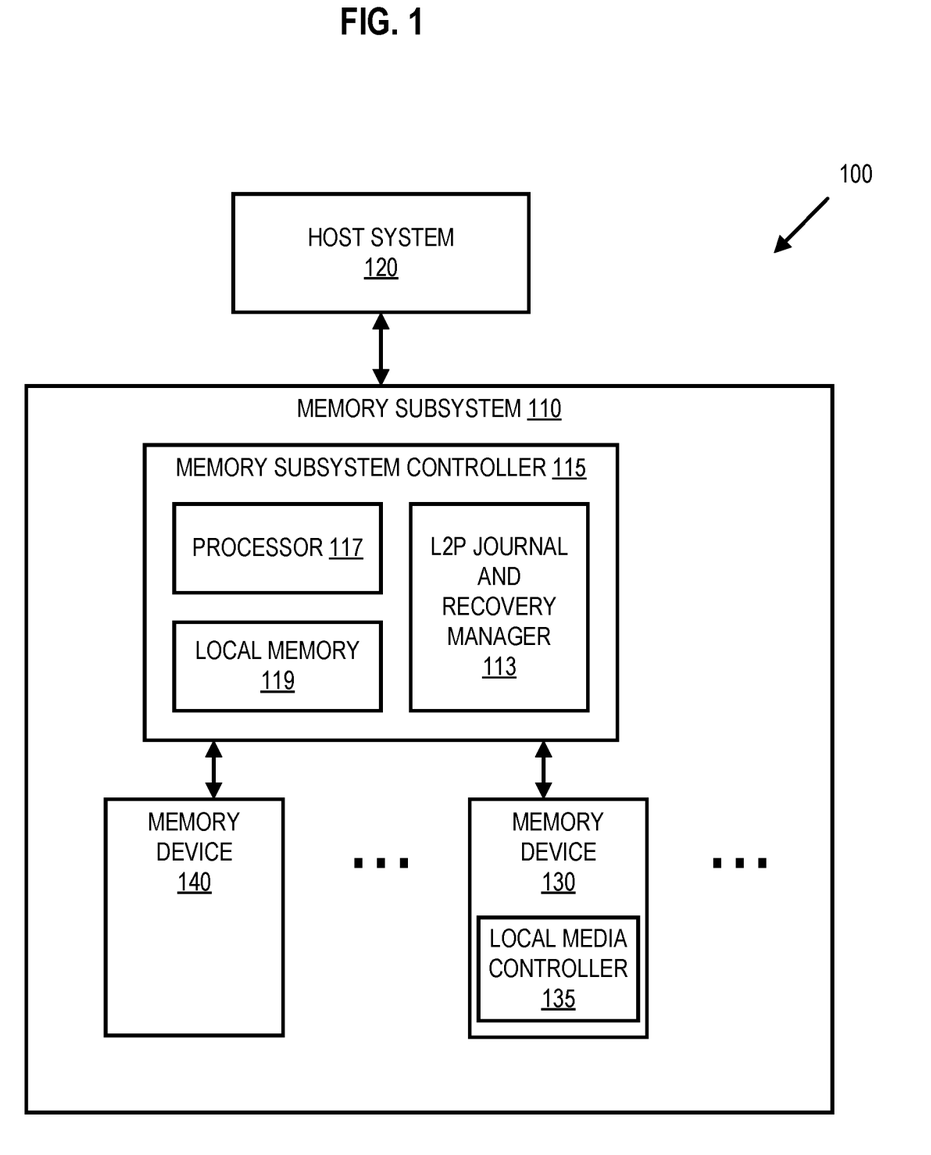
FIG. 1 illustrates an example computing system that includes a memory subsystem in accordance with some embodiments of the present disclosure.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory device(s) 130 and/or the memory device(s) 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes a L2P journal and recovery manager 113 that can maintain and rebuild logical-to-physical address mappings. In some embodiments, the controller 115 includes at least a portion of the L2P journal and recovery manager 113. For example, the controller 115 can include a processor 117 (processing device) configured to execute instructions stored in local memory 119 for performing the operations described herein. In some embodiments, a L2P journal and recovery manager 113 is part of the host system 120, an application, or an operating system.

The L2P journal and recovery manager 113 can track L2P entry evictions from a space-limited volatile memory in an L2P journal buffer, store copies of the L2P journal in non-volatile memory, and rebuild L2P mappings using stored L2P journal copies. Further details with regards to the operations of the L2P journal and recovery manager 113 are described below.

Figure 2:
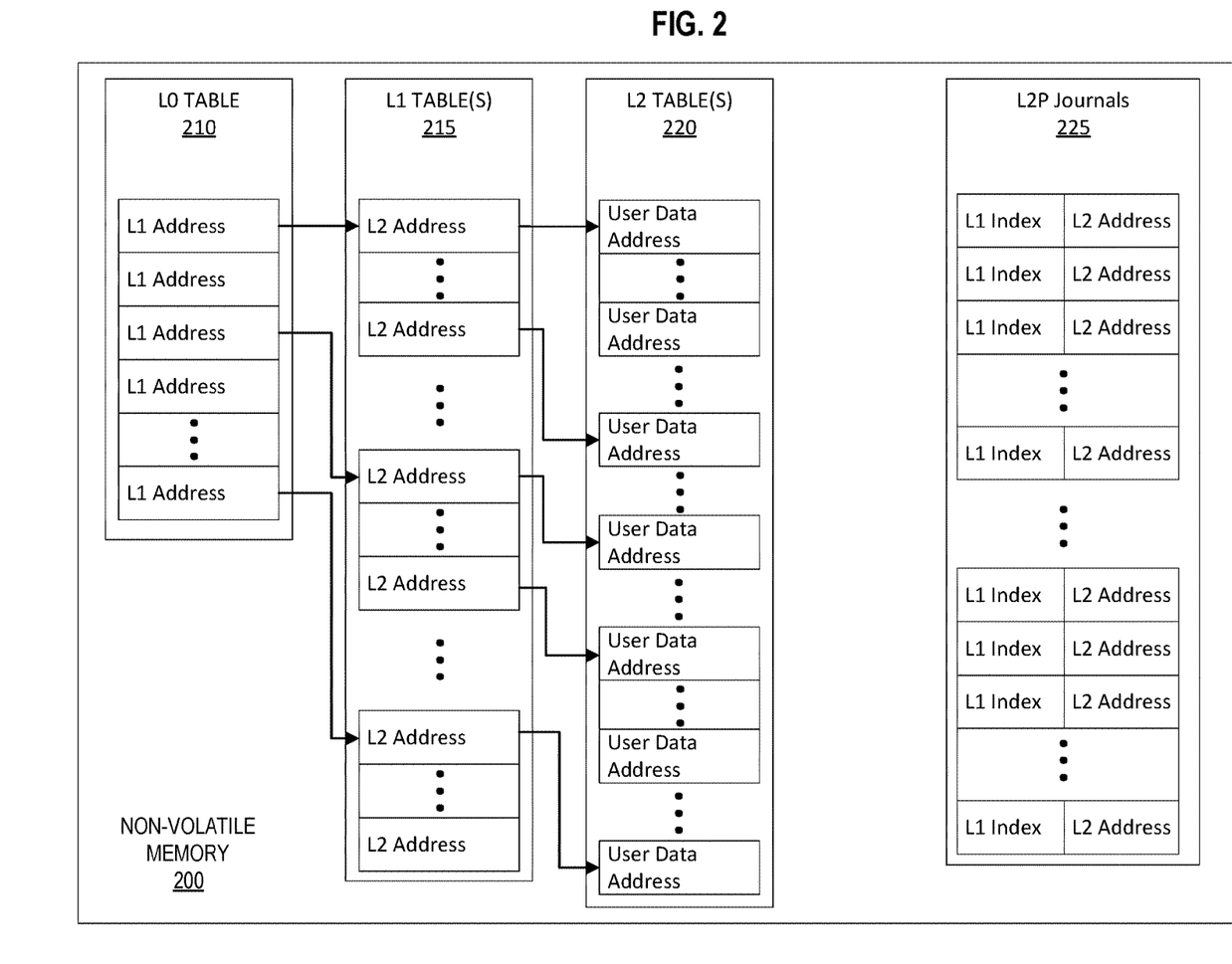
FIG. 2 illustrates examples of data structures to maintain and rebuild logical-to-physical address mappings in accordance with some embodiments of the present disclosure.

FIG. 2 illustrates a non-volatile memory 200 (e.g., implemented by one or more of the memory devices 130) storing examples of data structures to maintain and rebuild L2P mappings in accordance with some embodiments of the present disclosure. For example, the memory subsystem 110 can maintain L2P address mappings using hierarchical tables including a layer 0 (L0) table 210, one or more layer 1 (L1) tables 215, and one or more layer 2 (L2) tables 220. L0 table entries store physical addresses of L1 table entries. L1 table entries store physical addresses of L2 table entries. L2 table entries store physical addresses of host/user data. This hierarchy provides for efficient translations from a logical address of host/user data to the physical addresses of the host/user data.

The memory subsystem 110 can further maintain L2P address mappings using copies of L2P journals 225. Each L2P journal entry includes an index or other identifier of an entry in the L1 table(s) 215 and corresponding physical address of an L2 table entry. L2P journal entries are described further below.

Figure 3:
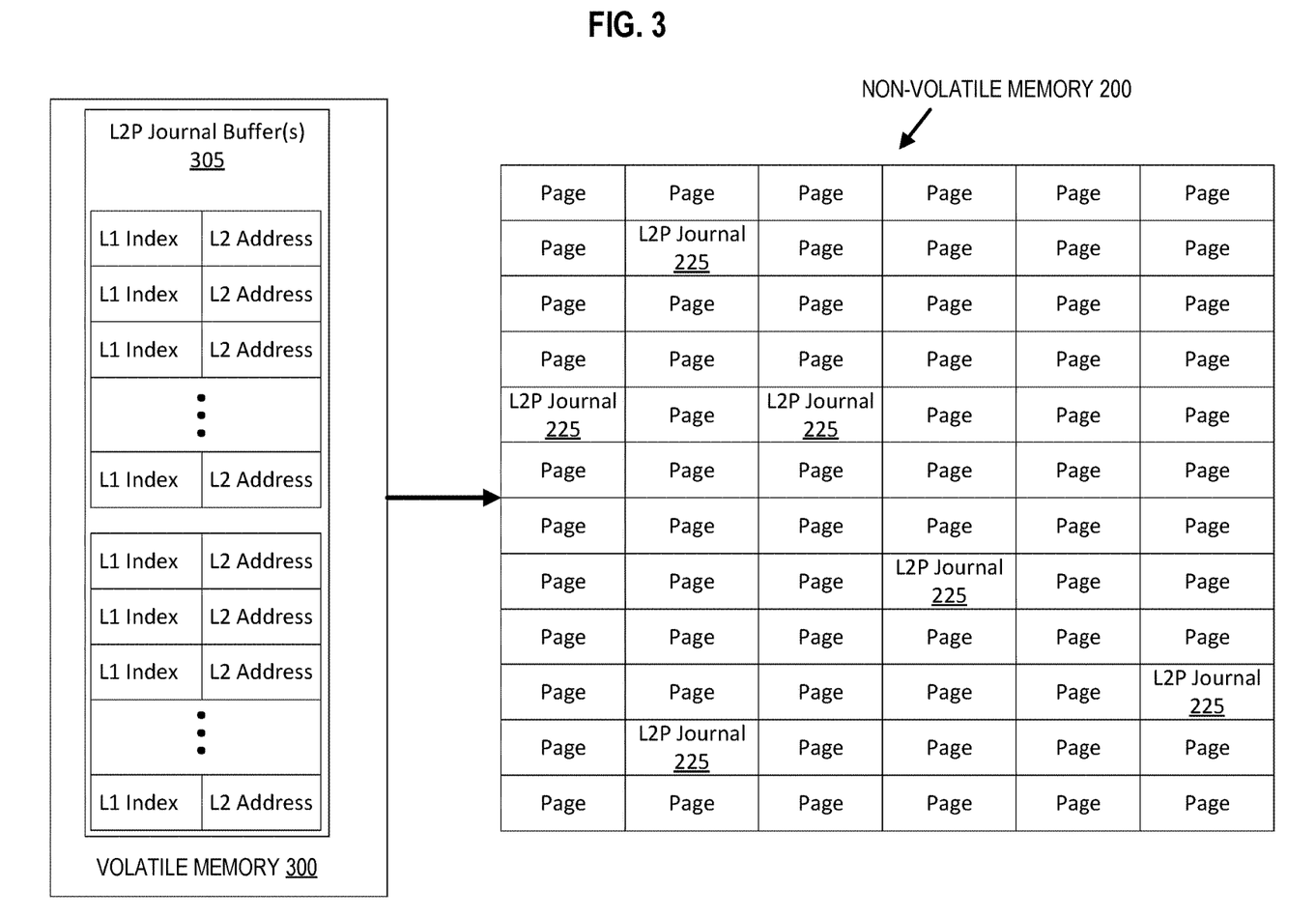
FIG. 3 illustrates an example of writing copies of a logical-to-physical address data structure to non-volatile memory in accordance with some embodiments of the present disclosure.

FIG. 3 illustrates an example of writing copies of L2P address data structures to non-volatile memory in accordance with some embodiments of the present disclosure. As described further herein, the memory subsystem controller 115 can operate with a limited amount of volatile memory 300 (e.g., implemented by one or more of the memory devices 140). The memory controller 115 operates with the size limits of the volatile memory 300 by storing only a portion of the hierarchical tables illustrated in and described with reference to FIG. 2 in the volatile memory 300 (L2P tables not shown in FIG. 3). For example, the memory subsystem 110 can read copies of the L0 table 210, L1 table(s) 215, and only a portion of the L2 table(s) 220 into the volatile memory 300. The memory subsystem 110 reads L2 table entries into volatile memory 300 and evicts L2 table entries from volatile memory 300 as needed.

Updates to existing host/user data and the writing of new host/user data can result in an update in the physical addresses of the hierarchical layers of L2P address mappings. The memory subsystem 110 initially maintains these updated physical addresses in volatile memory 300. As the memory subsystem 110 evicts L2 table entries from volatile memory 300 to free space for other L2 table entries, the memory subsystem 110 can write the updated L2 table entries to the non-volatile memory 200. Because L1 table entries are not evicted, the memory subsystem 110 continues to maintain updates to the L1 table(s) 215 that correspond to the evicted L2 table entries in volatile memory 300. To minimize the potential loss of these L1 table entry updates (e.g., during an APL), the L2P journal and recovery manager 113 writes updates to the L1 table(s) 215 as entries in an L2P journal buffer 305 in volatile memory 300. Each entry in the L2P journal buffer(s) 305 includes an index or other identifier of an entry in the L1 table(s) 215 and corresponding (updated) physical address of an evicted L2 table entry. The L2P journal and recovery manager 113 copies the L2P journal buffer (e.g., when full) to the non-volatile memory 200 to create a copy of the L2P journal 225 that can be used to recover the L1 table(s) 215, e.g., in response to an APL. In one embodiment, each copy of the L2P journal 225 includes a timestamp indicating when the copy 225 was written to non-volatile memory 200 or when one or more of the entries in the copy 225 were updated.

Figure 4:
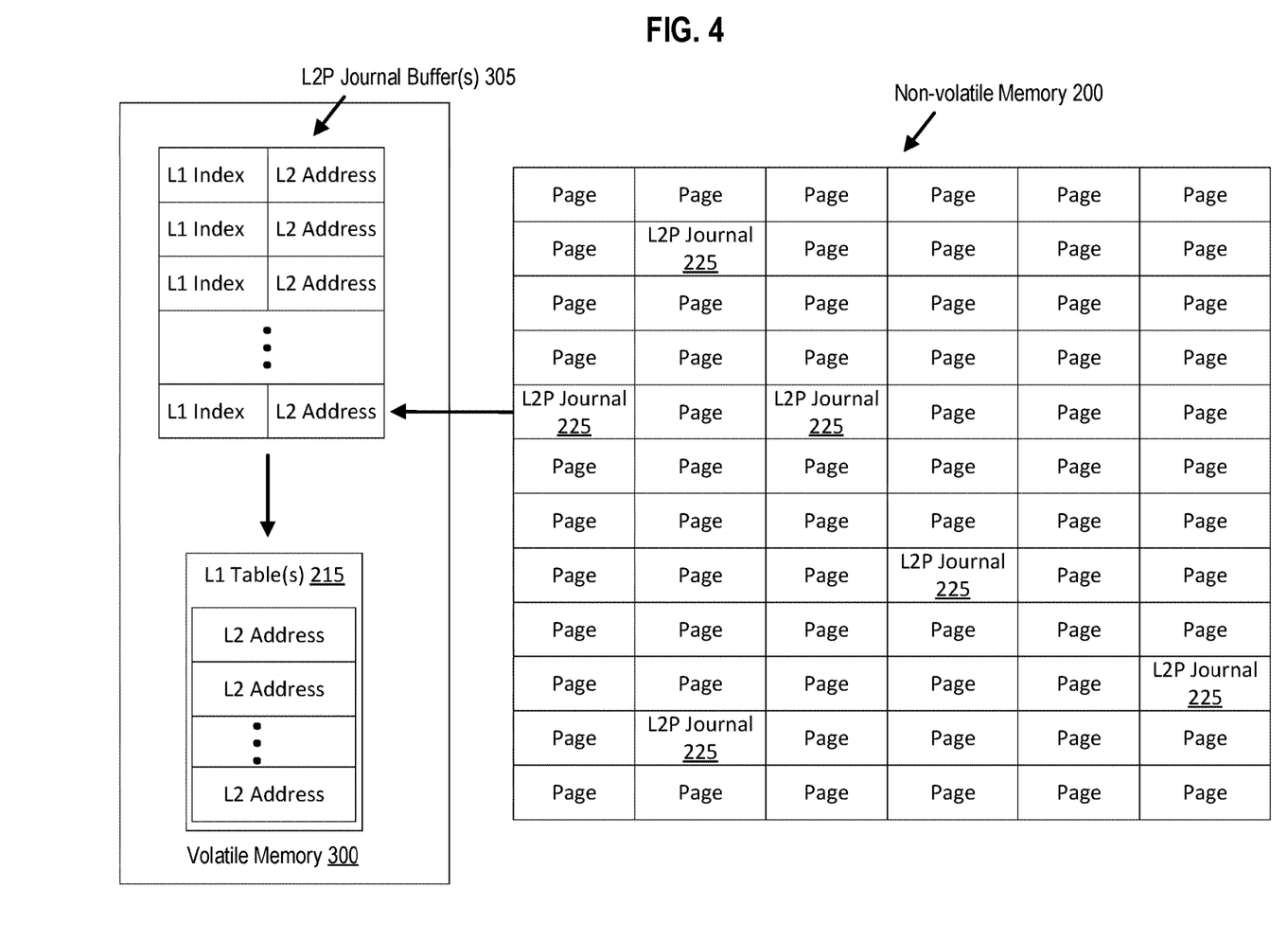
FIG. 4 illustrates an example of rebuilding logical-to-physical address mappings using data structures stored in non-volatile memory in accordance with some embodiments of the present disclosure.

FIG. 4 illustrates an example of rebuilding L2P address mappings using data structures stored in non-volatile memory 200 in accordance with some embodiments of the present disclosure. The memory subsystem 110 can rebuild the L2P address mappings in response to a trigger, such as an APL or another event that results in the loss of L2P address mappings that had not been flushed from volatile memory 300 to non-volatile memory 200 (i.e., the L2P data in the volatile memory 300 remained unmerged with the L2P table entries in the non-volatile memory 200). The L2P journal and recovery manager 113 rebuilds the L2P address mappings by reading the L0 table 210 and L1 table(s) 215 from non-volatile memory 200 into volatile memory 300. Additionally, the L2P journal and recovery manager 113 reads the oldest (as indicated by timestamp) copy of the L2P journal 225 into an L2P journal buffer 305. The oldest copy of the L2P journal 225 stores entries reflecting updates to L1 table entries that had not been copied to the L2P table entries in the non-volatile memory 200. The L2P journal and recovery manager 113 uses each entry in the L2P journal buffer 305 to update the L1 table(s) 215. For example, the L2P journal and recovery manager 113 copies the physical address of an L2 table entry from the L2P journal buffer entry and writes the L2 table entry address to the location in the L1 table(s) 215 corresponding to the index or other indicator in the L2P journal buffer entry. Once the L2P journal and recovery manager 113 uses all of the L2P journal buffer entries, the L2P journal and recovery manager 113 uses the next oldest copy of the L2P journal 225 (if there is one) and repeats the rebuilding process until the L2P address mappings are up to date with the latest copy of the L2P journal 225. In one embodiment, once the L2P journal and recovery manager 113 recovers lost L2P address mappings, the memory subsystem 110 copies the recovered L1 table entries to non-volatile memory. In one embodiment, once the memory subsystem 110 copies the recovered L1 table entries to non-volatile memory, the L2P journal and recovery manager 113 deletes (or marks for deletion) the copies of the L2P journal 225.

Figure 5:
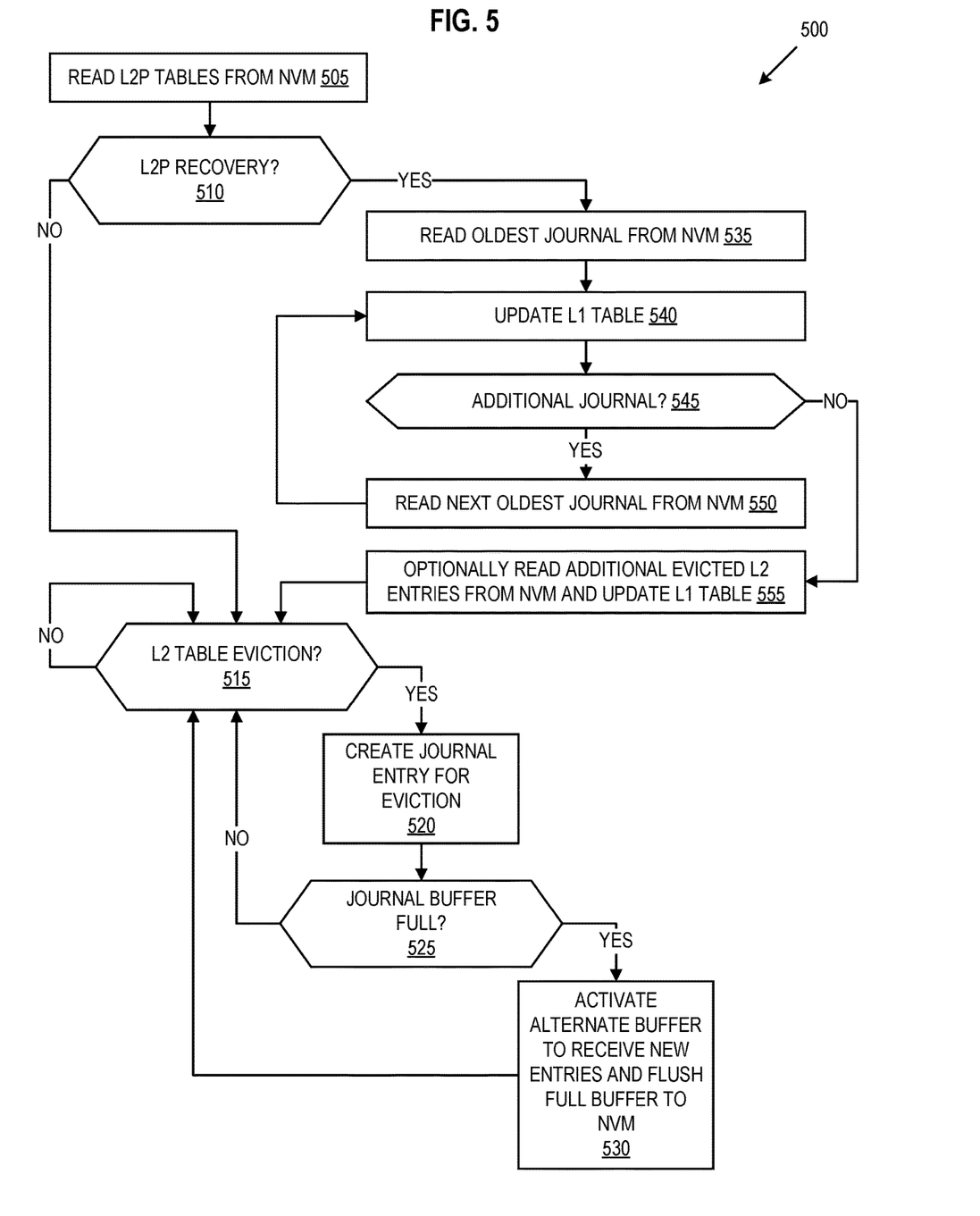
FIG. 5 is a flow diagram of an example method to maintain and rebuild logical-to-physical address mappings in accordance with some embodiments of the present disclosure.

FIG. 5 is a flow diagram of an example method 500 to maintain and rebuild logical-to-physical address mappings in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the L2P journal and recovery manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing device reads L2P table entries from non-volatile memory to volatile memory. For example, when powering on, resetting, etc., the processing device loads L0 table 210, L1 table(s) 215, and some of the L2 table(s) 220 from non-volatile memory 200 into volatile memory 300 for efficient address translation during operation of the memory subsystem 110.

At operation 510, the processing device determines if an event triggered recovery of L2P table entries. In one embodiment, the processing device reads or receives an indicator of the trigger event. For example, the trigger can be an APL or similar event resulting in the loss of L2P table updates that were stored in the volatile memory 300 but had not been flushed to the non-volatile memory 200.

At operation 515, if the processing device does not detect an event to trigger the recovery of L2P table entries, the processing device determines if an L2 table entry is to be evicted from the volatile memory 300. For example, the processing device can evict one L2 table entry from the volatile memory 300 to make room for another L2 table entry as described above. If no L2 table entry is to be evicted, the processing device awaits an eviction by returning to/remaining at operation 515.

At operation 520, in response to detecting the eviction of an L2 table entry, the processing device creates a journal entry corresponding to the evicted L2 table entry. For example, the processing device writes a L2P journal buffer entry including the L1 index of the L1 table entry pointing to the L2 table entry subject to eviction as well as the physical address of the L2 table entry subject to eviction. In one embodiment, the processing device creates a journal entry when the L2 table entry subject to eviction was updated after being read from the non-volatile memory 200. For example, a L2 table entry used to read data from the non-volatile memory 200 may not result in a change to the L2 table entry and therefore not justify the creation of an entry in the L2P journal buffer 305.

At operation 525, the processing device determines if the journal buffer satisfies a threshold. For example, the processing device can determine if the journal buffer is full. If the journal buffer does not satisfy the threshold, the processing device continues to use and maintain L2P address mappings at operation 515.

At operation 530, if the processing device determines the journal buffer satisfies the threshold, the processing device activates an alternate journal buffer and flushes the journal buffer that satisfied threshold. For example, the processing device an utilize ping pong buffers to create L2P journal copies 225 written to the non-volatile memory 200. When the "ping" buffer is full, the processing device can create entries in the "pong" buffer while the processing device flushes the entries of the "ping" buffer to the non-volatile memory 200. The method 500 returns to operation 515 to continue maintaining L2P address mappings using the alternate journal buffer.

At operation 535, if the processing device detects an event to trigger the recovery of L2P table entries, the processing device reads the oldest copy of the L2P journal 225 from the non-volatile memory 200. As discussed above, L2P journal copies 225 can include timestamps or other indicators of relative age to enable the processing device to select and read the oldest copy into an L2P journal buffer 305 in the volatile memory 300.

At operation 540, the processing device updates L1 table entries using the entries of the copy of the L2P journal 225 read into the L2P journal buffer 305. For example, the processing device copies the physical address of an L2 table entry from the L2P journal buffer entry and writes the address to the location in the L1 table(s) 215 corresponding to the index in the L2P journal buffer entry.

At operation 545, the processing device determines if there is an additional copy of the L2P journal 225 in the non-volatile memory 200. At operation 550, if the processing device determines if there is an additional copy of the L2P journal 225 in the non-volatile memory 200, the processing device reads next oldest copy of the L2P journal 225. Like operation 535, the processing device selects and reads the next oldest copy into an L2P journal buffer 305 in the volatile memory 300 based upon a timestamp or other age indicator. In one embodiment, the processing device uses ping pong buffers to load copies of the L2P journal 225. For example, while the processing device uses the "ping" buffer to read L2P journal entries and update L1 table entries, the processing device can load the next oldest copy of the L2P journal 225 into the "pong" buffer. When the processing device is ready to process the entries of the next oldest copy of the L2P journal 225, method 500 returns to operation 540.

At operation 555, when the processing device determines there is no additional copies of the L2P journal 225 to read from the non-volatile memory 200, the processing device optionally reads additional evicted L2 tables entries from the non-volatile memory 200 to update L1 table entries. For example, like the copies of the L2P journal 225, L2 table entries can include a timestamp or other indicator of age. If the processing device detects any L2 table entries written to the non-volatile memory 200 after the newest L2P journal copy 225, the processing device can read those L2 table entries into the volatile memory 300 and update the L1 table 215 accordingly. For example, the processing device can use the L2 table entry's physical address of the host/user data to read the metadata associated with the host/user data and obtain the virtual address of the host/user data. Using a translation of the virtual address, the processing device can determine the L1 table entry to update.

With the L2P address mapping recovered, the method 500 resumes maintaining L2P address mappings at operation 515.

Figure 6:
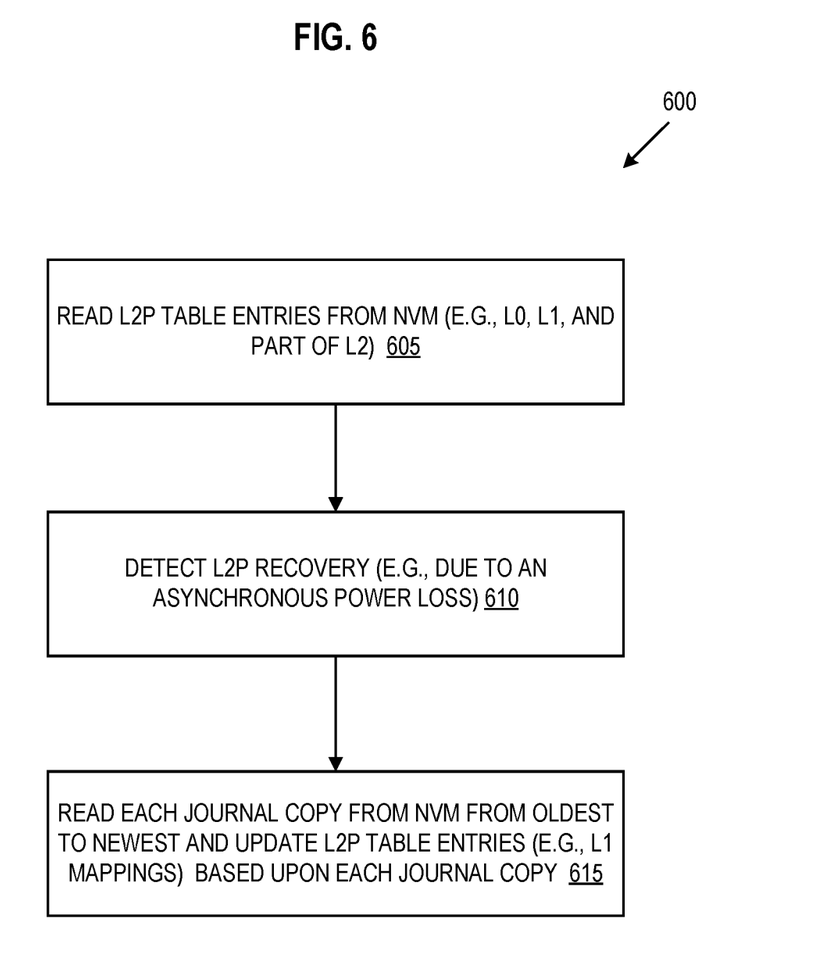
FIG. 6 is a flow diagram of another example method to rebuild logical-to-physical address mappings in accordance with some embodiments of the present disclosure.

FIG. 6 is a flow diagram of another example method 600 to rebuild logical-to-physical address mappings in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the L2P journal and recovery manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 605, the processing device reads L2P table entries from non-volatile memory to volatile memory. For example, the processing device reads L2P table entries as described above with reference to operation 505.

At operation 610, the processing device determines if an event triggered recovery of L2P table entries. For example, the processing detects an L2P recovery trigger as described above with reference to operation 510.

At operation 615, the processing device reads each journal copy from non-volatile memory in order of age and updates L2P table entries based upon each journal copy. For example, the processing device recovers L1 table entries as described above with reference to operations 535-550.

Figure 7:
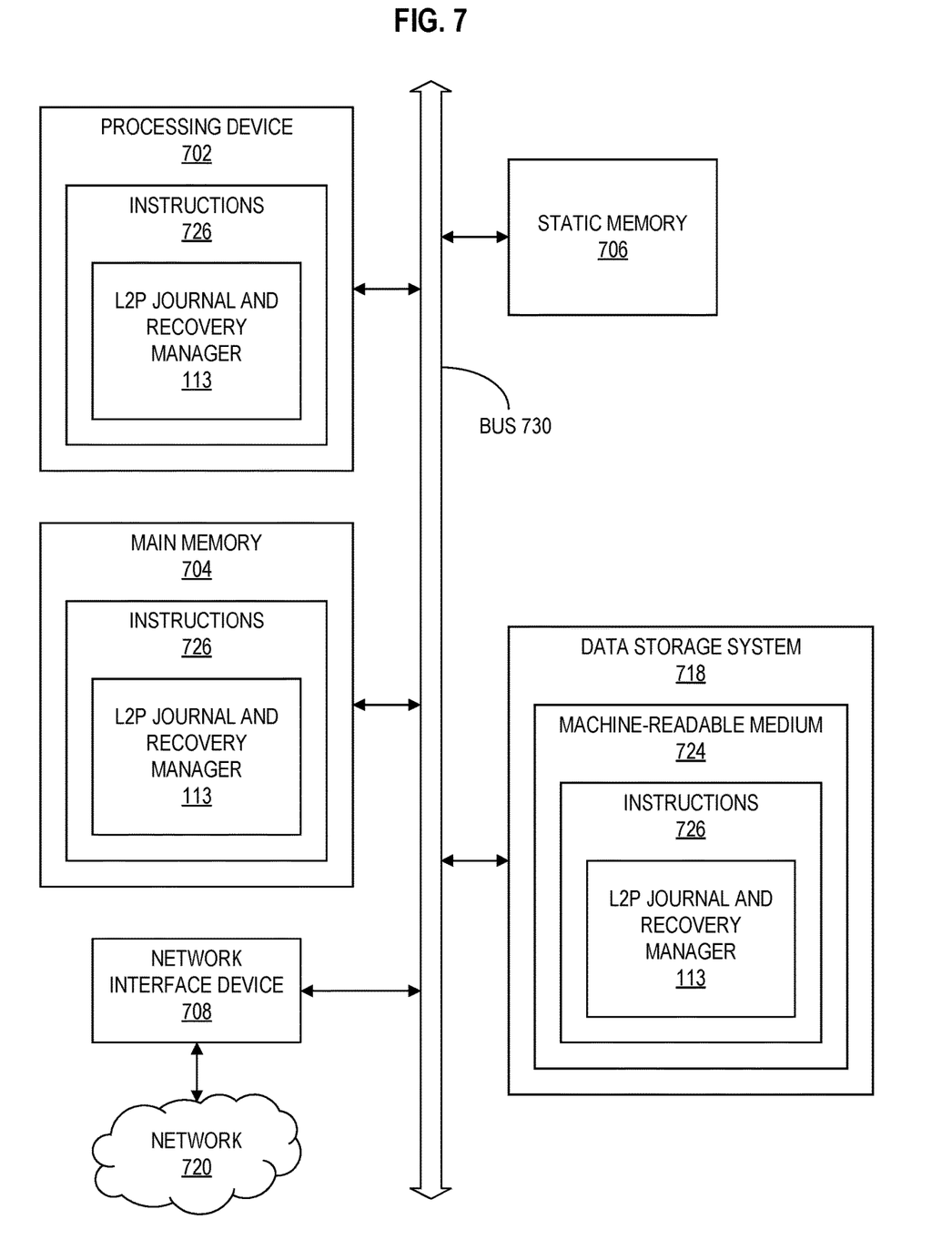
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the L2P journal and recovery manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory subsystem 110 of FIG. 1.

In one embodiment, the instructions 726 include instructions to implement functionality corresponding to a L2P journal and recovery manager (e.g., the L2P journal and recovery manager 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 500 and 600 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A non-transitory computer-readable storage medium comprising instructions that, when executed by a processing device, cause the processing device to:
  read a plurality of logical-to-physical (L2P) table entries from non-volatile memory into volatile memory, wherein the plurality of L2P table entries is a subset of all L2P table entries stored in the non-volatile memory and the volatile memory is limited to storing less than all of the L2P table entries stored in the non-volatile memory;
  in response to an eviction of a table entry from the volatile memory, create an L2P journal entry in a journal buffer in volatile memory;
  detect a trigger to recover L2P data that was unmerged with the L2P table entries;
  in response to detecting the trigger:
    read a copy of an L2P journal from non-volatile memory, the L2P journal including the L2P data that was unmerged with the L2P table entries; and
    update one or more of the L2P table entries using the L2P data from the L2P journal.

2. The non-transitory computer-readable storage medium of claim 1, wherein:
the L2P table entries include layer 0 table entries, layer 1 table entries, and layer 2 table entries;
the L2P journal includes journal entries, each journal entry including a layer 1 table entry identifier and a physical address storing a layer 2 table entry; and
updating the L2P table entries includes updating layer 1 table entries based upon the journal entries.

3. The non-transitory computer-readable storage medium of claim 2, wherein reading the L2P table entries into volatile memory includes omitting some layer 2 table entries.

4. The non-transitory computer-readable storage medium of claim 2, wherein the eviction is an eviction of a layer 2 table entry from the volatile memory.

5. The non-transitory computer-readable storage medium of claim 1, wherein the processing device is further to:
in response to detecting that the journal buffer satisfies a threshold, write the journal buffer as a new copy the L2P journal to the non-volatile memory.

6. The non-transitory computer-readable storage medium of claim 1, wherein the trigger is an asynchronous power loss.

7. The non-transitory computer-readable storage medium of claim 1, wherein reading the copy of the L2P journal includes reading an oldest L2P journal copy, and wherein the processing device is further to:
read a next-oldest copy of the L2P journal from non-volatile memory; and
update one or more of the L2P table entries with L2P data from the next-oldest copy of the L2P journal.

8. A system comprising:
a memory device; and
a processing device, operatively coupled with the memory device, to:
read a plurality of logical-to-physical (L2P) table entries from non-volatile memory into volatile memory, wherein the plurality of L2P table entries is a subset of all L2P table entries stored in the non-volatile memory and the volatile memory is limited to storing less than all of the L2P table entries stored in the non-volatile memory;
in response to an eviction of a table entry from the volatile memory, create an L2P journal entry in a journal buffer in volatile memory;
detect a trigger to recover L2P data that was unmerged with the L2P table entries;
in response to detecting the trigger:
read a copy of an L2P journal from non-volatile memory, the L2P journal including the L2P data that was unmerged with the L2P table entries; and
update one or more of the L2P table entries using the L2P data from the L2P journal.

9. The system of claim 8, wherein:
the L2P table entries include layer 0 table entries, layer 1 table entries, and layer 2 table entries;
the L2P journal includes journal entries, each journal entry including a layer 1 table entry identifier and a physical address storing a layer 2 table entry; and
updating the L2P table entries includes updating layer 1 table entries based upon the journal entries.

10. The system of claim 9, wherein reading the L2P table entries into volatile memory includes omitting some layer 2 table entries.

11. The system of claim 9, wherein the eviction is an eviction of a layer 2 table entry from the volatile memory.

12. The system of claim 8, wherein the processing device is further to:
in response to detecting that the journal buffer satisfies a threshold, write the journal buffer as a new copy the L2P journal to the non-volatile memory.

13. The system of claim 8, wherein the trigger is an asynchronous power loss.

14. The system of claim 8, wherein reading the copy of the L2P journal includes reading an oldest L2P journal copy, and wherein the processing device is further to:
read a next-oldest copy of the L2P journal from non-volatile memory; and
update one or more of the L2P table entries with L2P data from the next-oldest copy of the L2P journal.

15. A method comprising:
reading a plurality of logical-to-physical (L2P) table entries from non-volatile memory into volatile memory, wherein the L2P table entries include layer 0 table entries, layer 1 table entries, and layer 2 table entries, and wherein the plurality of L2P table entries is a subset of all L2P table entries stored in the non-volatile memory and the volatile memory is limited to storing less than all of the L2P table entries stored in the non-volatile memory;
in response to an eviction of a table entry from the volatile memory, creating an L2P journal entry in a journal buffer in volatile memory;
detecting a trigger to recover L2P data that was unmerged with the L2P table entries;
in response to detecting the trigger:
reading a copy of an L2P journal from non-volatile memory, the L2P journal including journal entries storing the L2P data that was unmerged with the L2P table entries, wherein each journal entry includes a layer 1 table entry identifier and a physical address storing a layer 2 table entry; and
updating one or more layer 1 table entries of the L2P table entries using the L2P data from the L2P journal.

16. The method of claim 15, wherein reading the L2P table entries into volatile memory includes omitting some layer 2 table entries.

17. The method of claim 15, wherein the eviction is an eviction of a layer 2 table entry from the volatile memory.

18. The method of claim 15, further comprising:
in response to detecting that the journal buffer satisfies a threshold, writing the journal buffer as a new copy the L2P journal to the non-volatile memory.

19. The method of claim 15, wherein the trigger is an asynchronous power loss.

20. The method of claim 15, wherein reading the copy of the L2P journal includes reading an oldest L2P journal copy, the method further comprising:
reading a next-oldest copy of the L2P journal from non-volatile memory; and
updating one or more of the L2P table entries with L2P data from the next-oldest copy of the L2P journal.

* * * * *